Dec. 29, 1964   R. MAINHARDT ETAL   3,163,541
SYNTHETIC MEAT
Filed Sept. 26, 1961
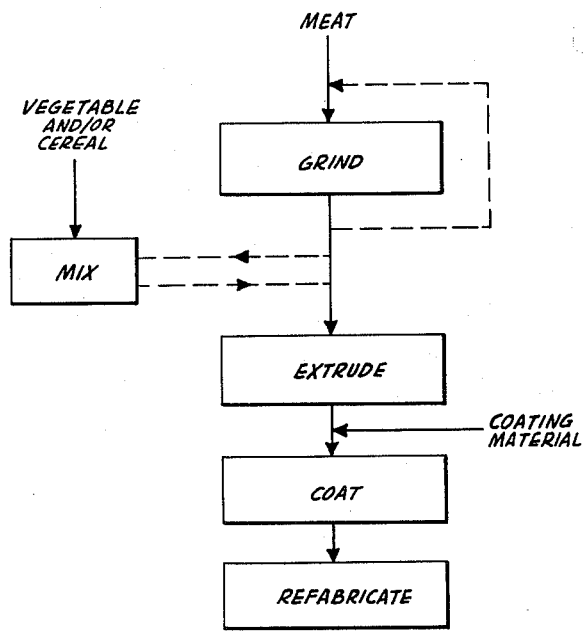
INVENTORS:
ROBERT MAINHARDT
ARTHUR T. BIEHL
BY
*Eikhoff and Slick*
ATTORNEYS

United States Patent Office 3,163,541
Patented Dec. 29, 1964

3,163,541
SYNTHETIC MEAT
Robert Mainhardt and Arthur T. Biehl, both of Walnut Creek, Calif., assignors to The Union Stock Yard and Transit Company of Chicago, Chicago, Ill., a corporation of Illinois
Filed Sept. 26, 1961, Ser. No. 140,829
5 Claims. (Cl. 99—108)

This invention relates to a process for reconstituting meat and more particularly relates to a process for reproducing the structure found in high grade cuts of meat from relatively low grade cuts.

At the present time demand for high quality meat exceeds the supply. As a result, the high grade cuts of meat sell at much higher prices than the lower grade cuts of meat despite the fact that the latter are just as nutritious and have as good or better flavor. Generally speaking, the higher grade cuts of meat, such as the most expensive cuts of steak, have a grain which comprises parallel strands. The meat is composed of microscopic thread-like muscle cells which are bound together into bundles, which in turn are banded together into larger bundles by a frame work of connective tissue. The higher grade cuts have long fibers of similar size and structure lined generally parallel to each other and are relatively free of large masses of connective tissue.

Although attempts have heretofore been made to upgrade the quality of meat, such attempts have invariably resulted in meat which is easier to chew but which does not have the characteristic texture which one associates with the higher grade cuts of meat.

In accordance with the present invention a process is provided wherein a muscle fiber finely ground, is then extruded in a series of parallel fine strands, the strands coated with a binder and then joined together to form a composite product which has the characteristic structure of high quality steak.

The first step in conducting the process of the present invention comprises grinding the meat in a grinder using discs with the lowest available hole size. The meat should be passed through the grinder at least twice and preferably three times. The temperature at which the grinding operation takes place is not critical and may vary from —40 to 70° F. but generally is conducted about 50° F. to preserve the quality of the meat. Instead of using a conventional meat grinder, or in addition thereto, the meat may be passed through a blender wherein it is subjected to an action of a series of sharp knives rotating at a high rate of speed.

After the meat is ground, it may be passed directly to the extrusion step or, if desired, the ground meat may be first mixed with vegetables and/or cereal. The material is then extruded through a die, preferably one having an opening of from 20 to 50 mils. Although the meat could be extruded through the die without prior grinding, this requires such high pressure that it is ordinarily not practical. Nevertheless, extrusion without prior grinding may be employed.

After being extruded, the meat is coated with a coating material, as is hereinafter described. It is important that the coating be applied immediately upon extrusion since it is desired that each fiber be uniformly coated.

After the coating operation the meat is then refabricated by placing the fibers in parallel alignment within a container and then applying a small amount of pressure thereto to consolidate the mass, care being taken to prevent the inclusion of air.

Various adhesive materials may be used such as acetylated monoglycerides, algin, collagens, gelatins and carboxymethylcellulose. Of these materials, it is preferred to use collagen since this is a natural occurring material in animal fibers and also gives excellent results in preparing the meat. The amount of the coating material is preferably very small and can vary from a .05 to 5% by weight of the finished product.

In the drawing acompanying this application the sole figure is a block diagram showing the steps utilized in carrying out the present invention.

The following non-limiting examples illustrate preferred embodiments of this invention.

*Example I*

One hundred pounds of raw ground hamburger meat was reground by passing it through a meat grounder having fine openings. The ground meat was then placed in the die and extruded through openings .05 inch in diameter. One-fourth pound of collagen was brushed on the extruded fibers and the fibers were placed in a rectangular vessel in parallel alignment. Pressure was then applied to the vessel and the product was chilled. The product was then taken from the mold and sliced into steaks which had the characteristic structure of high quality steak.

*Example II*

One hundred pounds of raw ground hamburger meat are mixed with 20 pounds of a water solution containing 0.25% by weight of "Methocel" (carboxymethylcellulose) U.S.P. grade having a viscosity of 4000 cps. in 2% solution at room temperature. To the resulting mixture, 20 pounds of whole canned peas are added and are thoroughly incorporated in the mass. The resulting mass is placed in a stuffing machine and extruded through a die having a hole size of 0.02 inch under 3–5 pounds pressure into elongated cylindrical metal molds of 4½″ diameter, care being taken to prevent the presence of air in the mold or in the mix. It is noted that the liquid constituents of the mass substantially completely fill the voids between the food particles thereby facilitating removal of air. The mass in the metal molds is then hard-frozen and removed from the molds while still in frozen form and sliced into ¼″ patties. These patties, while still frozen, are then packaged in the usual manner for retail sale as a frozen food product.

The process was then repeated with solution concentrations of "Methocel" including 0.5, 0.75, 1.0, and 2.0% solutions, in amounts varying between 20 and 50% by weight. All provide satisfactory products which vary slightly with respect to hardness.

The term meat as used in this application includes poultry and fish.

We claim:
1. The process of upgrading meat comprising extruding the meat through a die in a series of fine parallel fibers, coating said individual fibers with an edible adhesive in an amount within the range of 0.05 to 5 percent by weight of the product, and compressing the extruded fibers in parallel alignment in a mold whereby there is produced a reconstituted meat having the characteristics of high quality steak.

2. The process of claim 1 wherein the meat is ground before extrusion.

3. The process of claim 1 wherein the meat is extruded through a die having openings at from .05 to .02 inch in diameter.

4. The process of claim 1 wherein the coating material is selected from acetylated monoglycerides, algin, collagens, gelatin and carboxymethylcellulose.

5. The process of claim 1 wherein the coating material is collagen.

References Cited in the file of this patent

UNITED STATES PATENTS

| | | |
|---|---|---|
| 2,879,163 | Anson et al. | Mar. 24, 1959 |
| 3,041,182 | Hansen et al. | June 26, 1962 |
| 3,093,483 | Ishler et al. | June 11, 1963 |

FOREIGN PATENTS

| | | |
|---|---|---|
| 672,035 | Great Britain | May 14, 1952 |

OTHER REFERENCES

Feuge: "Food Technology," 9, 314–318, June 1955.